(12) United States Patent
Luc (10) Patent No.: US 7,586,809 B2
(45) Date of Patent: Sep. 8, 2009

(54) UNDERWATER SENSOR AND DATA SENSING AND RECORDING APPARATUS

(75) Inventor: Francois Luc, New South Wales (AU)

(73) Assignee: Sercel Australia Pty. Ltd., Sydney (AU)

( * ) Notice: Subject to any disclaimer, the term of this patent is extended or adjusted under 35 U.S.C. 154(b) by 0 days.

(21) Appl. No.: 11/186,003

(22) Filed: Jul. 20, 2005

(65) Prior Publication Data

US 2005/0249040 A1    Nov. 10, 2005

(30) Foreign Application Priority Data

Jan. 20, 2003    (AU) .............................. 2003900280

(51) Int. Cl.
*G01V 1/38* (2006.01)
(52) U.S. Cl. ......................... 367/15; 367/178
(58) Field of Classification Search ............. 367/15–24, 367/178
See application file for complete search history.

(56) References Cited

U.S. PATENT DOCUMENTS

| | | | | |
|---|---|---|---|---|
| 4,138,658 A | * | 2/1979 | Avedik et al. ................. | 367/15 |
| 4,300,220 A | * | 11/1981 | Goff et al. ................... | 367/188 |
| 4,703,135 A | | 10/1987 | Magnani et al. ............. | 174/135 |
| 4,951,264 A | * | 8/1990 | Yamamoto .................... | 367/15 |
| 5,189,642 A | | 2/1993 | Donoho et al. ................ | 367/15 |
| 5,442,590 A | * | 8/1995 | Svenning et al. .............. | 367/15 |
| 5,738,464 A | | 4/1998 | Delrieu ........................ | 405/202 |
| 5,747,754 A | | 5/1998 | Svenning et al. | |
| 6,657,921 B1 | * | 12/2003 | Ambs ........................... | 367/20 |
| 6,932,185 B2 | * | 8/2005 | Bary et al. ................... | 181/122 |
| 6,951,138 B1 | * | 10/2005 | Jones ........................... | 73/769 |
| 6,975,560 B2 | * | 12/2005 | Berg et al. .................... | 367/16 |

FOREIGN PATENT DOCUMENTS

| | | | |
|---|---|---|---|
| DE | 19747251 | | 11/1998 |
| FR | 1 213 522 | | 6/2002 |
| WO | WO9812577 | * | 3/1998 |
| WO | 03/009072 | | 11/2003 |

* cited by examiner

*Primary Examiner*—Jack W. Keith
*Assistant Examiner*—Scott A Hughes
(74) *Attorney, Agent, or Firm*—Connolly Bove Lodge & Hutz LLP (57) ABSTRACT

The apparatus has a sensor disposed on the first end of an elongate connector by means of fixed interface link. A recorder unit is disposed on the second end of the connector opposite the first end. The connector is bendable within a predefined curvature range. When the apparatus is deployed into the sea, it is adapted to free-fall through the body of water and to land on the seafloor such that the sensor is spaced apart from the recorder unit. The apparatus is additionally adapted to substantially vibrationally de-couple the sensor from the recorder unit. The length of the connector is dynamically variable within a predefined range so as to minimize vibration coupling between the recorder unit to the sensor. Physical separation of the sensor and the recorder unit, together with the mechanical characteristics of the connector, ensure that the sensor is substantially vibrationally de-coupled from the recorder unit.

25 Claims, 12 Drawing Sheets

UNDERWATER SENSOR AND DATA SENSING AND RECORDING APPARATUS

PRIORITY

Priority is claimed under 35 U.S.C. §§120 and 365 to Patent Cooperation Treaty application Serial No. PCT/AU2004/000067 filed on Jan. 20, 2004, which claims priority to Australian patent application Serial No. 2003900280, filed on Jan. 20, 2003, the disclosures of which are incorporated herein by reference.

BACKGROUND OF THE INVENTION

1. Field of the Invention

The present invention relates to improved sensors and also to an improved sensor and data recording unit. The invention has been developed primarily for use in the acquisition of seismic data via the sensing of seismic signals at the seafloor and will be described hereinafter with reference to this application. However it will be appreciated that the invention is not limited to this particular field.

2. Background

Any discussion of the prior art throughout the specification should in no way be considered as an admission that such prior art is widely known or forms part of common general knowledge in the field.

Instruments for recording seismic data at the seafloor have been in use for many years. Such instruments were developed initially for earthquake monitoring and were subsequently modified for other applications such as geophysics and petroleum reservoir development research. They are generally referred to as Ocean Bottom Seismometers and may be deployed to a water depth of up to 6000 meters.

Ocean Bottom Seismometers typically include electronics such as a data logger, an accurate clock and batteries. Such prior art units may also include recovery means such as a weight release mechanism. The sensors typically utilise geophones and/or hydrophones.

It has been appreciated by the inventors of the present patent application, that some prior art ocean bottom seismometers exhibit at least some of the following performance characteristics:

poor frequency response due to the mass of the sensor/recorder unit;
 poor frequency response due to inadequate transfer of seismic vibrations from the seafloor to the sensors;
 excessive weight and complexity, particularly in relation to those prior art units which utilise a relatively heavy chassis which is required to land vertically on the seafloor after which a sensor is lowered onto the seafloor by a mechanical release mechanism;
 excessive deployment complexity;
 instability of the sensor, particularly when deployed onto an irregular seafloor;
 excessive vulnerability to damage from external impacts; and
 non-uniform sensing of seismic waves due to lack of sensor symmetry, particularly in relation to prior art sensors encapsulated in a spherical housing and those sensors having an elongate cylindrical body which, once deployed, may be free to roll in a direction perpendicular to the cylindrical axis.

It is an object of the present invention to overcome or ameliorate at least one of the disadvantages of the prior art, or to provide a useful alternative.

SUMMARY OF THE INVENTION

According to a first aspect of the invention there is provided a data sensing and recording apparatus for deployment into a body of water defining a floor, said apparatus including:

a sensor disposed on a first end of an elongate connector; and
 a recorder unit disposed on a second end of said connector opposite said first end, said connector being bendable within a predefined curvature range and wherein said connector resists further bending beyond said predefined curvature range, and wherein said apparatus is adapted to free-fall through the body of water and to land on the floor such that the sensor is spaced apart from the recorder unit and such that the sensor is substantially vibrationally de-coupled from the recorder unit.

Preferably the sensor is separately rotatable relative to said recorder unit.

In a preferred embodiment, the predefined curvature range is such that at maximum curvature the connector curves by a total of not more than 90° so as to prevent the sensor and recorder from landing on top of each other when landing on the floor.

According to a second aspect of the present invention there is provided a sensor including:

a body adapted to house sensor electronics; and
 a plurality of feet disposed on or adjacent to said body, each of said feet defining a projection adapted to enhance mechanical coupling of the sensor with a floor of a body of water.

Preferably the sensor defines a first base and a second base opposite said first base, wherein the sensor is adapted for deployment such that either the first base or the second base is adjacent the floor.

According to a third aspect of the present invention there is provided a sensor including:

a body adapted for deployment in a first orientation, and for deployment in a second orientation inverted relative to the first orientation; and
 a plurality of omnidirectional geophones each having an axis of sensitivity;
 said geophones having a sensitivity which varies dependent upon an inclination of each geophones axis of sensitivity relative to a local gravitational field;
 wherein each of said geophones are disposed within said body such that, when deployed, each axis of sensitivity is disposed at substantially the same angle of inclination relative to said local gravitational field, thereby allowing all of said geophones to exhibit the same or similar sensitivity regardless of whether the body is in the first or second orientation.

Preferably each of said omnidirectional geophones are orthogonal to each other.

According to another aspect of the present invention there is provided a sensor including:

a body adapted for deployment in a first orientation, and for deployment in a second orientation inverted relative to the first orientation;
 a pair of horizontal-type geophones adapted for sensing horizontal seismic movements disposed horizontally and orthogonally relative to each other; and
 first and second vertical-type geophones disposed vertically and adapted for sensing vertical seismic movements, each vertical-type geophone having a functional orientation and an insensitive orientation, the first vertical-type geophone being disposed such that its functional orientation is inverted relative to the functional orientation of the second vertical-type geophone, such that, when said body is in the first orientation, the first vertical-type geophone is functional and the second vertical-type geophone is insensitive and when said body is in the second orientation, the second vertical-type geophone is functional and the first vertical-type geophone is insensitive.

Preferably the vertical-type geophones are electrically connected in series or parallel, or their outputs electrically summed in electronic preamplifiers, or the output of the favourable geophone selected by tilt switches.

BRIEF DESCRIPTION OF THE DRAWINGS

Preferred embodiments will now be described, with reference to the accompanying drawings, in which.

DETAILED DESCRIPTION OF THE PREFERRED EMBODIMENTS

Referring to the drawings, the preferred data sensing and recording apparatus 40 is designed for deployment into a body of water such as the open sea for use in acquiring seismic data. In typical expeditions seeking seismic data, a large number of identical sensing and recording apparatus 40, are deployed onto the seafloor and used to detect seismic waves propagating across the seafloor. A typical seismic shear wave in seafloor sediment travels at approximately 50 ms-1, has a frequency of up to around 80 Hz and has a ¼ wavelength of about 16 cm.

The illustrated preferred embodiment is engineered for use at depths of up to approximately 2000 meters, however other embodiments may be engineered for deployment at other depths.

Figure 1:
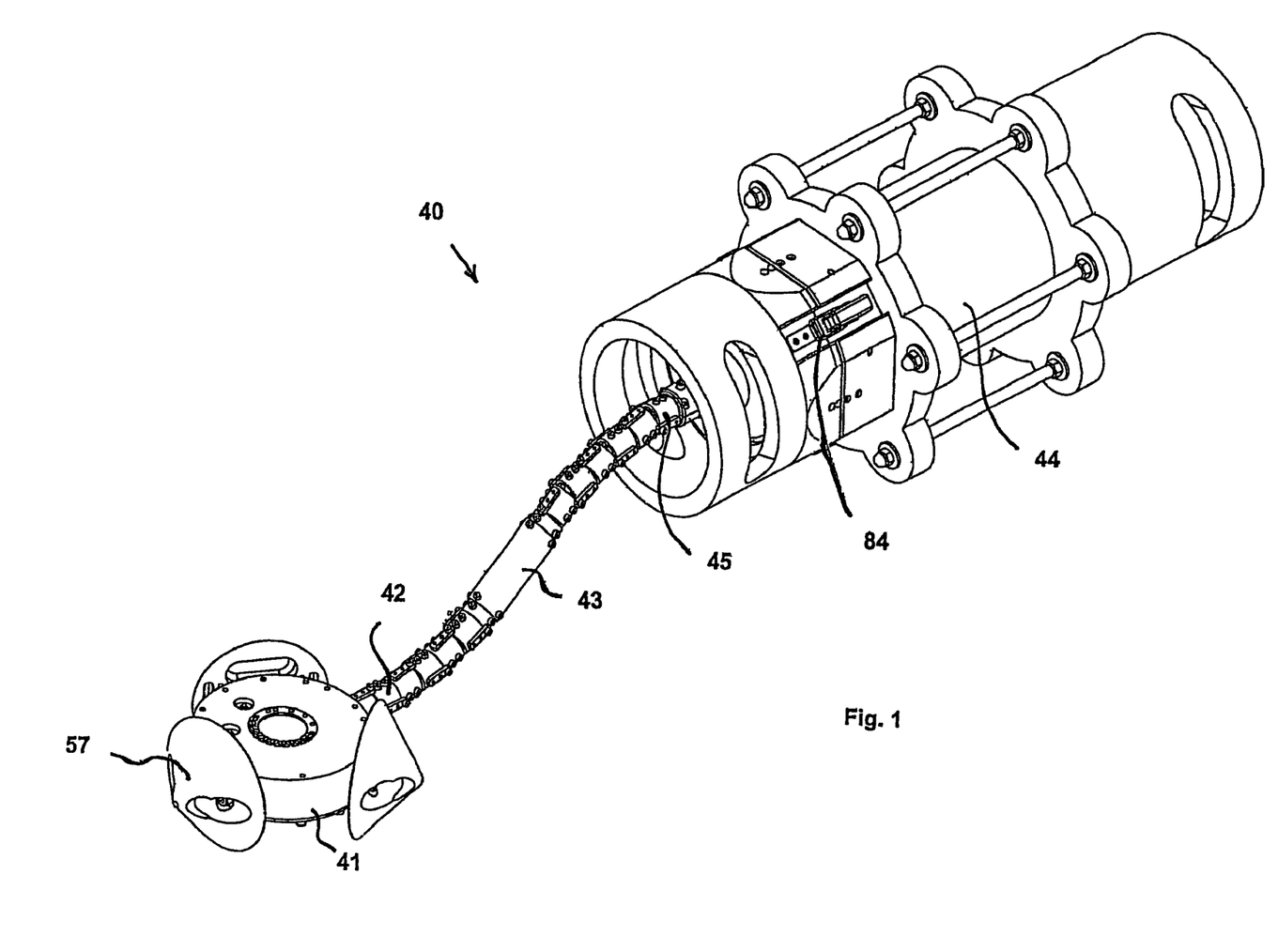
FIG. 1 is a perspective view of a preferred embodiment of a data sensing and recording apparatus according to the present invention.
Figure 2:
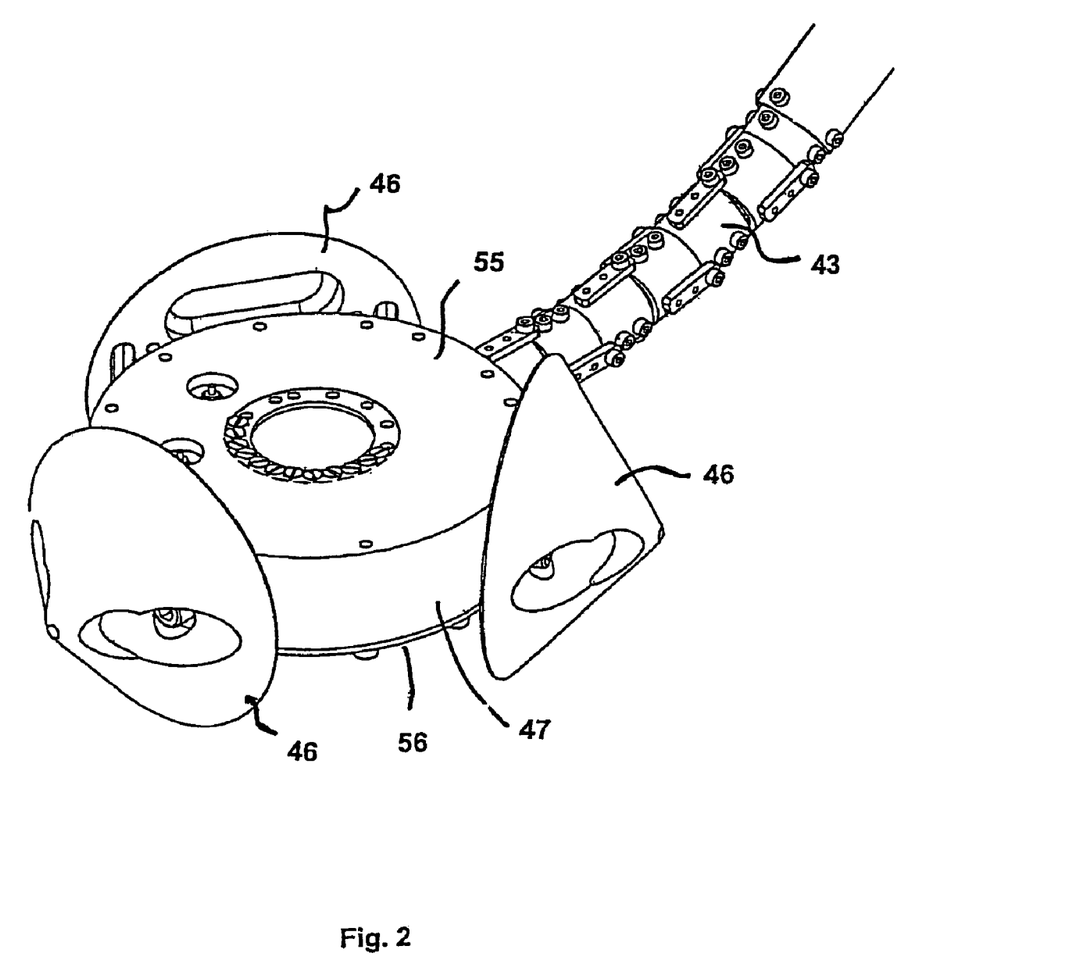
FIG. 2 is a perspective view of a preferred embodiment of a sensor according to the present invention.
Figure 3:
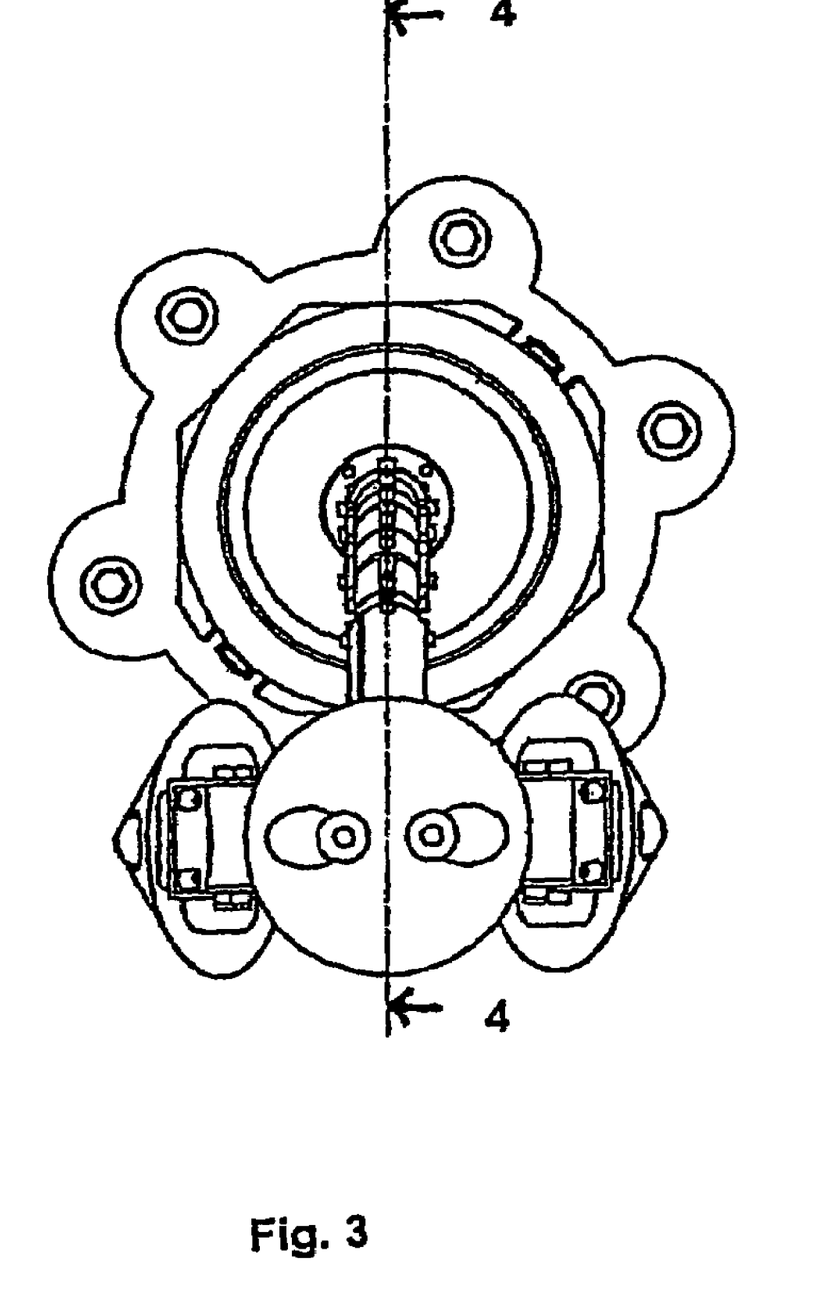
FIG. 3 is an end view of the apparatus shown in FIG. 1.
Figure 4:
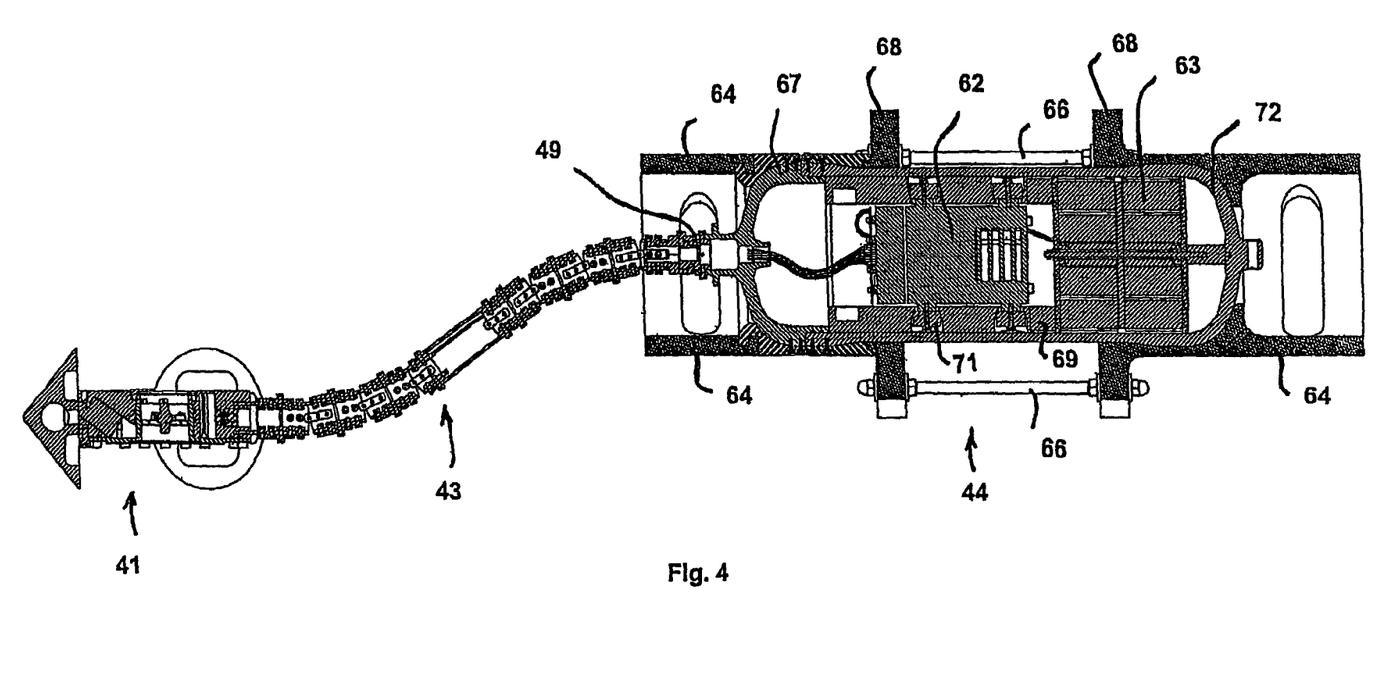
FIG. 4 is a cross sectional view of the apparatus taken along line 4-4 of FIG. 3.
Figures 5, 6, 7, 8, 9, 10, 11, 12:
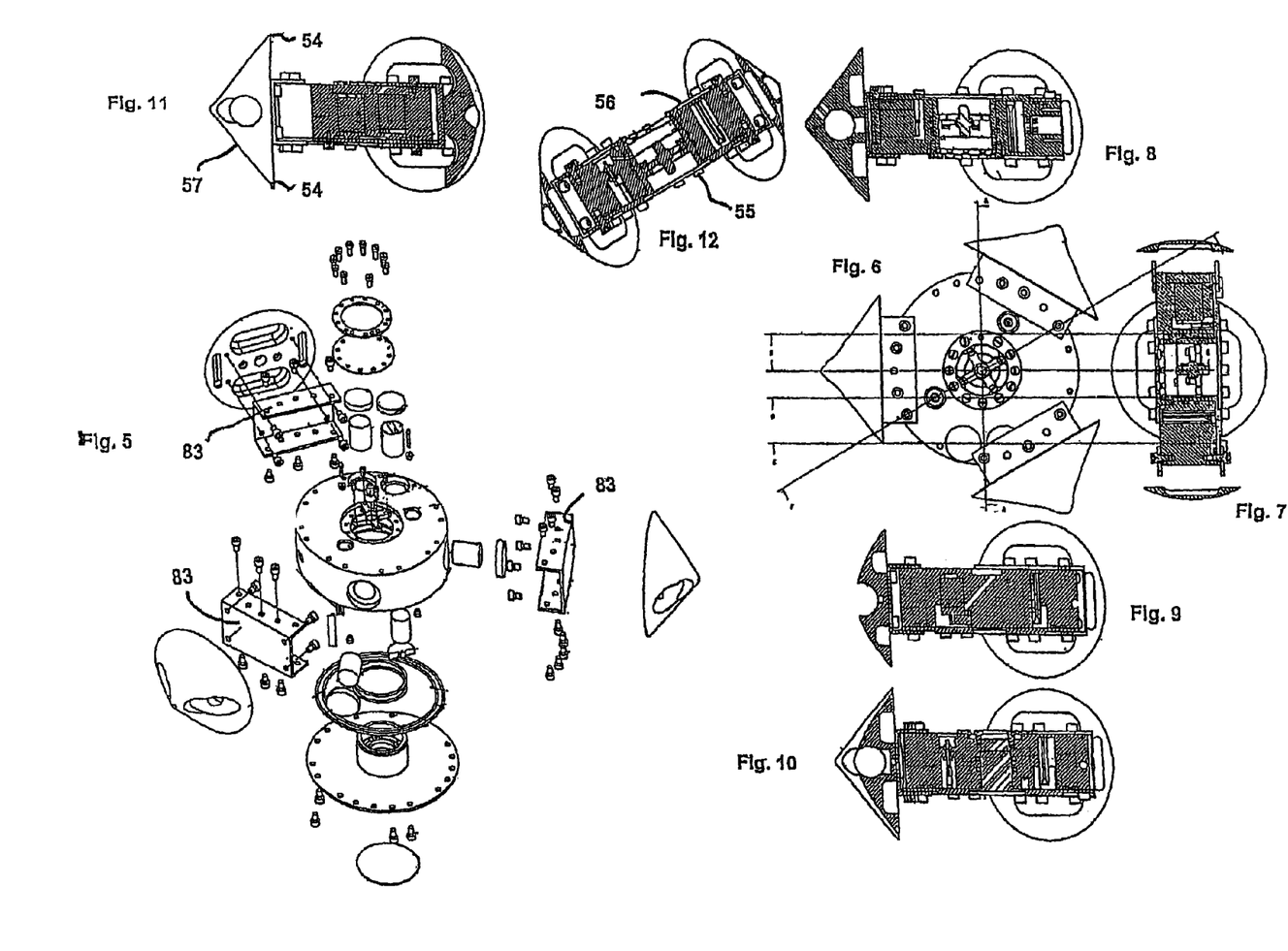
FIG. 5 is an exploded disassembled view of another embodiment of the sensor.
FIG. 6 is a top view of the sensor shown in FIG. 5.
FIG. 7 is a cross sectional view of the sensor taken along line A-A of FIG. 6.
FIG. 8 is a cross sectional view of the sensor taken along line B-B of FIG. 6.
FIG. 9 is a cross sectional view of the sensor taken along line C-C of FIG. 6.
FIG. 10 is a cross sectional view of the sensor taken along line D-D of FIG. 6.
FIG. 11 is a cross sectional view of the sensor taken along line E-E of FIG. 6.
FIG. 12 is a cross sectional view of the sensor taken along line F-F of FIG. 6.

The apparatus 40 has a sensor 41 disposed on the first end 42 of an elongate connector 43 by means of fixed interface link 79. A recorder unit 44 is disposed on the second end 45 of the connector 43 opposite the first end 42. The connector 43 is bendable within a predefined curvature range. The preferred connector 43, when in a straight configuration, can be freely bent in all directions. However the connector 43 resists further bending beyond a predefined curvature range. That is, the connector 43 can be bent up to a maximum degree of curvature, after which the connector 43 cannot bend. to assume a tighter. radius of curvature. However the connector 43 is at all times free to bend so as to assume a straighter configuration. Alternative connectors 43 are disclosed in French Patent Document No. FR 2817941 and European Patent Document No. EP1213522, entitled 'Device for limiting the curvature of a cable, especially for an underwater cable', Coupeaud C, Suppa V., the contents of which are hereby incorporated in their entirety be reference. Preferably the connector 43 is manufactured from high strength grade Aluminum or Titanium or fibre doped high strength plastic.

The predefined curvature range of the connector 43 is such that at maximum curvature the connector curves by a total of not more than 90°. When the apparatus 40 is deployed into the sea, it is adapted to free-fall through the body of water and to land on the seafloor such that the sensor 41 is spaced apart from the recorder unit 44. In other words, the recorder unit 44 cannot land directly on top of the sensor 41, and vice versa. Rather, regardless of the orientation of the apparatus 40 when it lands on the seafloor (that is, recorder unit 44 lowermost, or sensor 41 lowermost) the not more than 90° bending of the connector 43 will cause the apparatus to overbalance so that the recorder unit 44 lands on the seafloor in a position which is spaced apart from the sensor 41.

The connector 43 is long enough to allow the sensor 41 to sit on the seafloor when the recorder unit does likewise. The length of the connector 43 is dynamically variable within a predefined range so as to eradicate or minimise coupling of any vibration of the recorder unit 44 to the sensor 41. Hence, any vibration of the recorder unit 44 in a direction parallel to the elongate dimension of the connector 43 is isolated from the sensor 41. In the preferred embodiment, the predefined range of allowable length variation of the connector 43 is equal to or less than 4% of the total connector length. This is achieved by allowing a small degree of mechanical play in the detail design of the connector 43 parts.

The physical separation of the sensor 41 and the recorder unit 44, together with the mechanical characteristics of the connector 43, ensure that the sensor 41 is substantially vibrationally de-coupled from the recorder unit 44. In other words, the mass of the recorder unit 44 does not inhibit the sensor 41 from responding to seismic waves, and any vibration of the recorder unit 44 (for example due to any water currents that may be flowing in the vicinity of the recorder unit 44) is not transmitted to the sensor 41. In other words, the connector 43 constitutes a positive mechanical connection between the sensor 41 and the recorder unit 44 so far as maximum separation distance is concerned, however not so far as seismic or flow induced vibrations are concerned.

Figure 18:
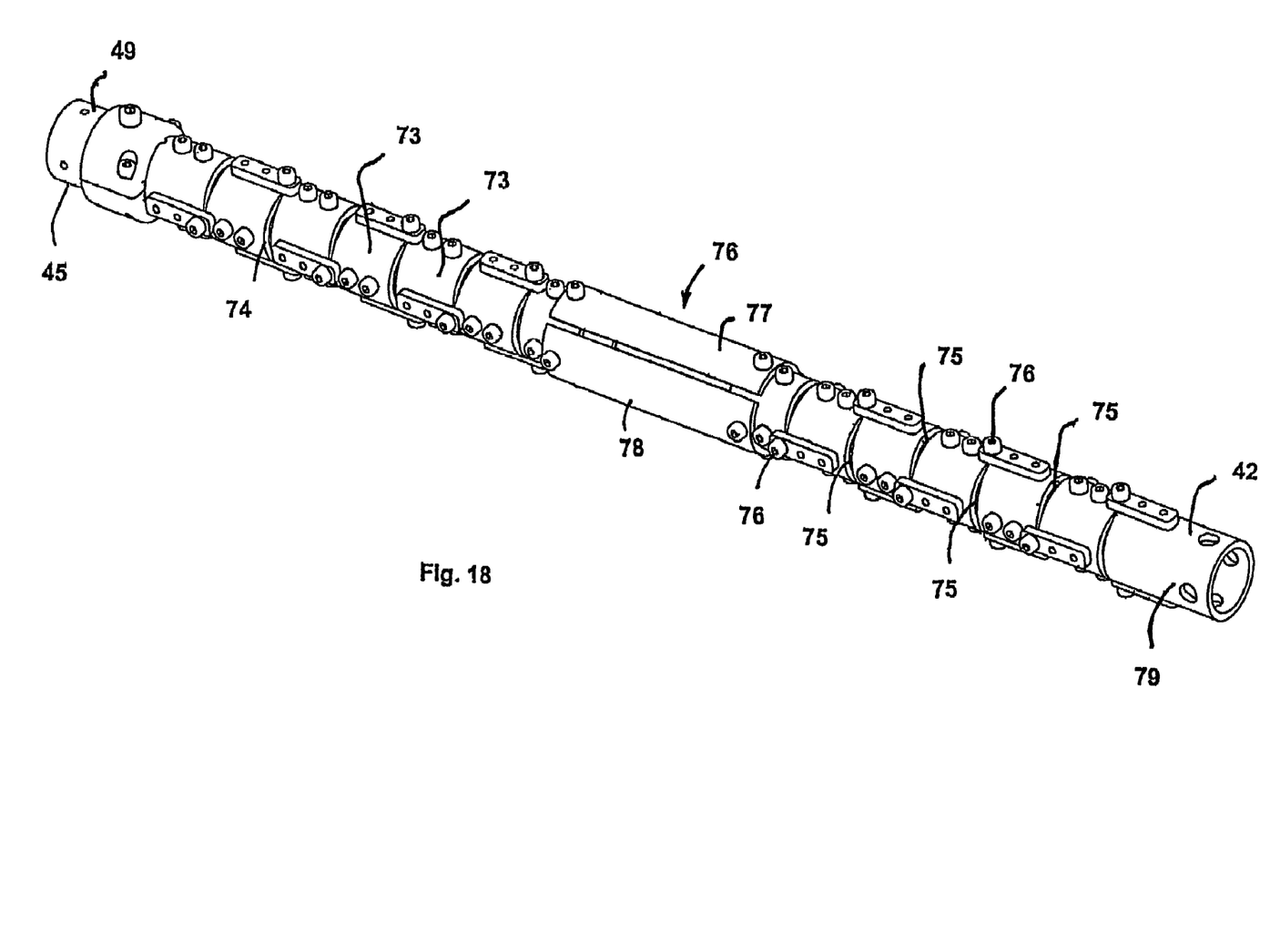
FIG. 18 is a perspective view of a connector according to a preferred embodiment of the present invention.
Figure 19:
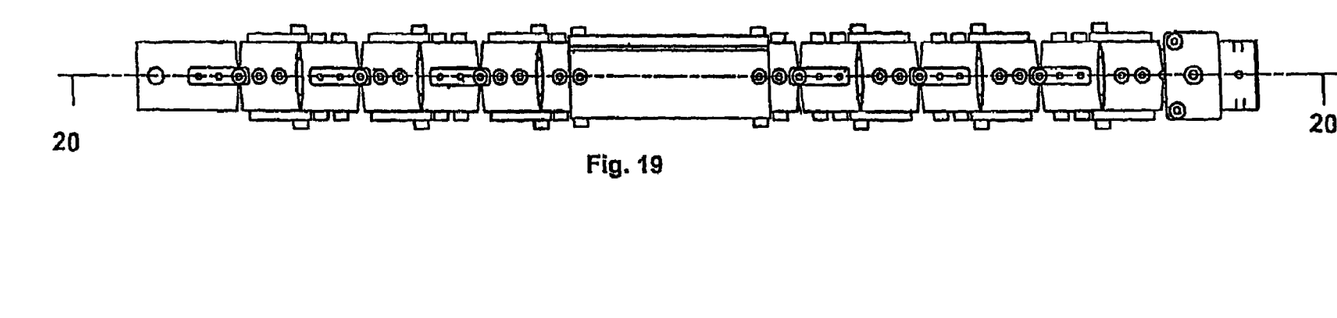
FIG. 19 is a plan view of the connector shown in FIG. 18.
Figure 20:
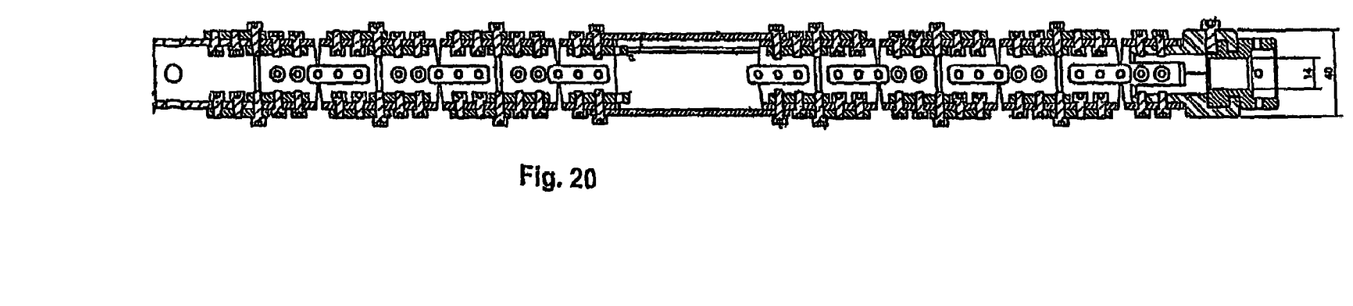
FIG. 20 is a cross sectional view of the connector taken along line 20-20 of FIG. 19.
Figure 21:
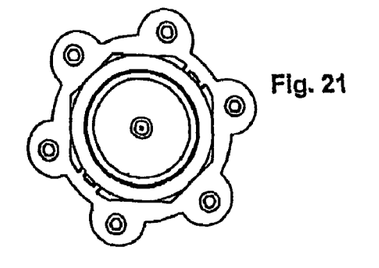
FIG. 21 is an end view of the recorder unit with the end cap and internal electronics removed.
Figures 22, 23:
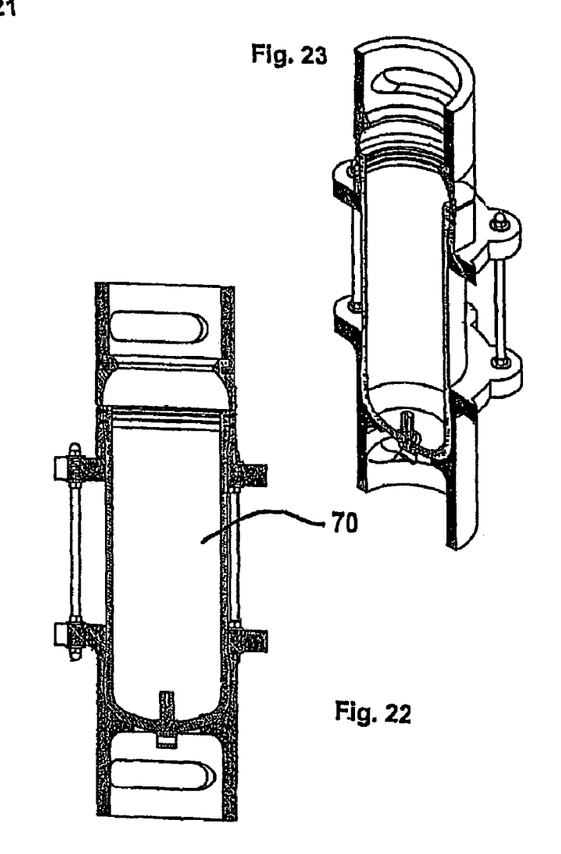
FIG. 22 is a cross sectional view corresponding to that shown in FIG. 14, however with the internal electronics removed.
FIG. 23 is a cross sectional view corresponding to that shown in FIG. 15, however with the internal electronics removed.

The connector is formed from a plurality of short tubes 73, each of which have slightly angled ends 74. The identical short tubes 73 are disposed end-to-end such that the slightly angled ends 74 create gaps 75 which provide some clearance for the bending of the connector 43. Links 76 connect adjacent tubes 73 and provide a pivot point there between. The tubes 73 are connected to one another such that the gap 75 alternates by 90° relative to the adjacent gap. This gives the overall connector 43 the freedom to bend in all directions, up to, but not beyond, the predefined curvature range. When two tubes 73 of the connector 43 are bent by a few degrees relative to each other sufficient to close the gap 75 there between, that pair of tubes resists further bending in that direction.

The connector 42 houses a communications cable 48 electrically connected at the first end 42 to electronics 50 disposed within the sensor 41 and electrically connected at the second end 45 to electronics 51 disposed within the recorder unit 44. The connector 43 also protects the cable 48 from damage. An elongated tube 76 is disposed roughly half way along the length of the connector 43. It is formed from two half-shell pieces 77 and 78. This is an assembly aid to allow for connection of the communication cable 48.

Figures 24, 25, 26, 27, 28:
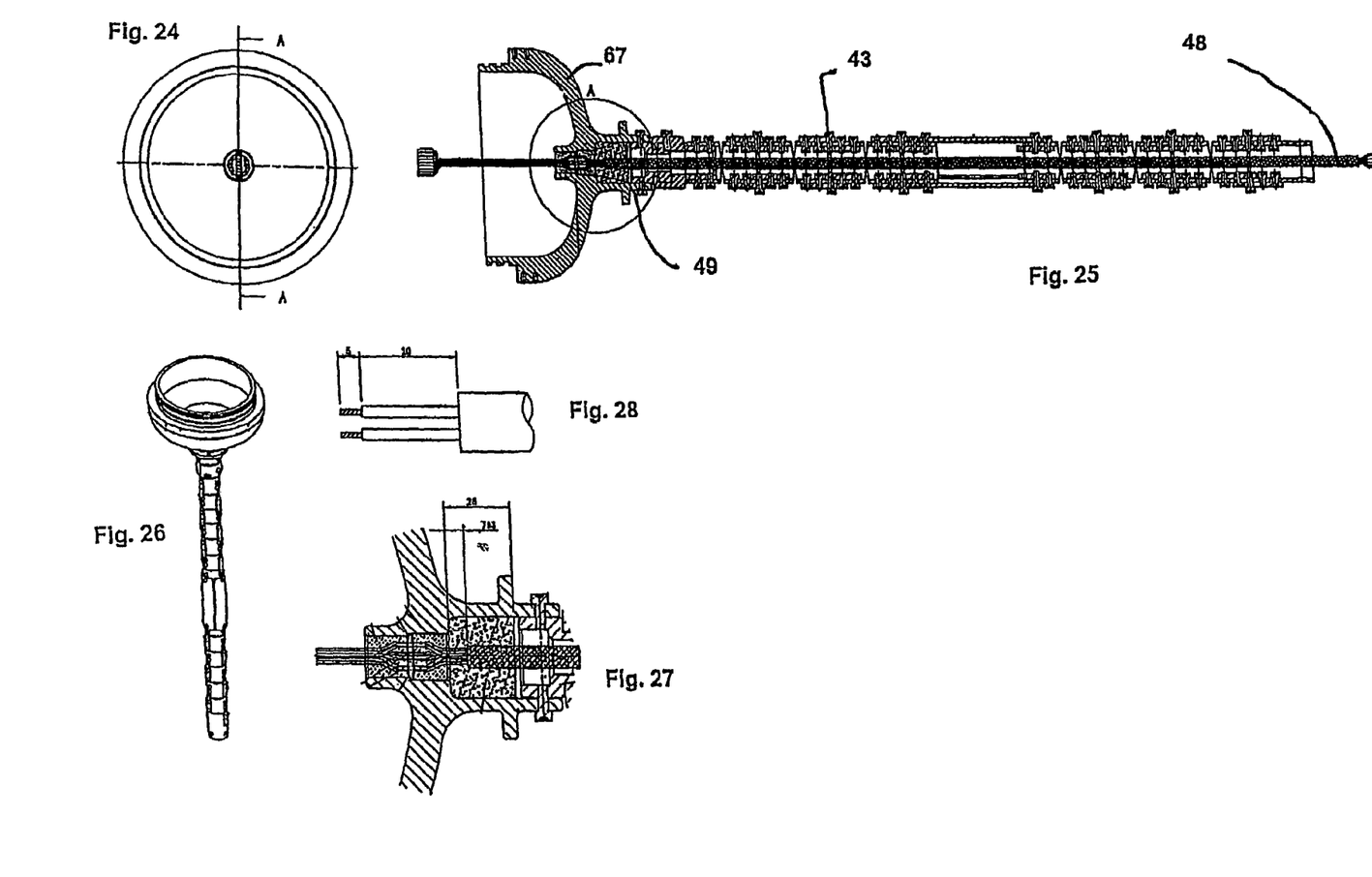
FIG. 24 is an end view of the connector and an end cap of the recorder unit.
FIG. 25 is a cross sectional view of the connector and an end cap of the recorder unit taken through line A-A of FIG. 24.
FIG. 26 is a perspective view of the connector and an end cap of the recorder unit.
FIG. 27 is a cross sectional view of the region marked 'A' in FIG. 25.
FIG. 28 shows the cable preparation for termination of the cable to the recorder end cap.
Figures 29, 31, 32, 33, 34, 35:
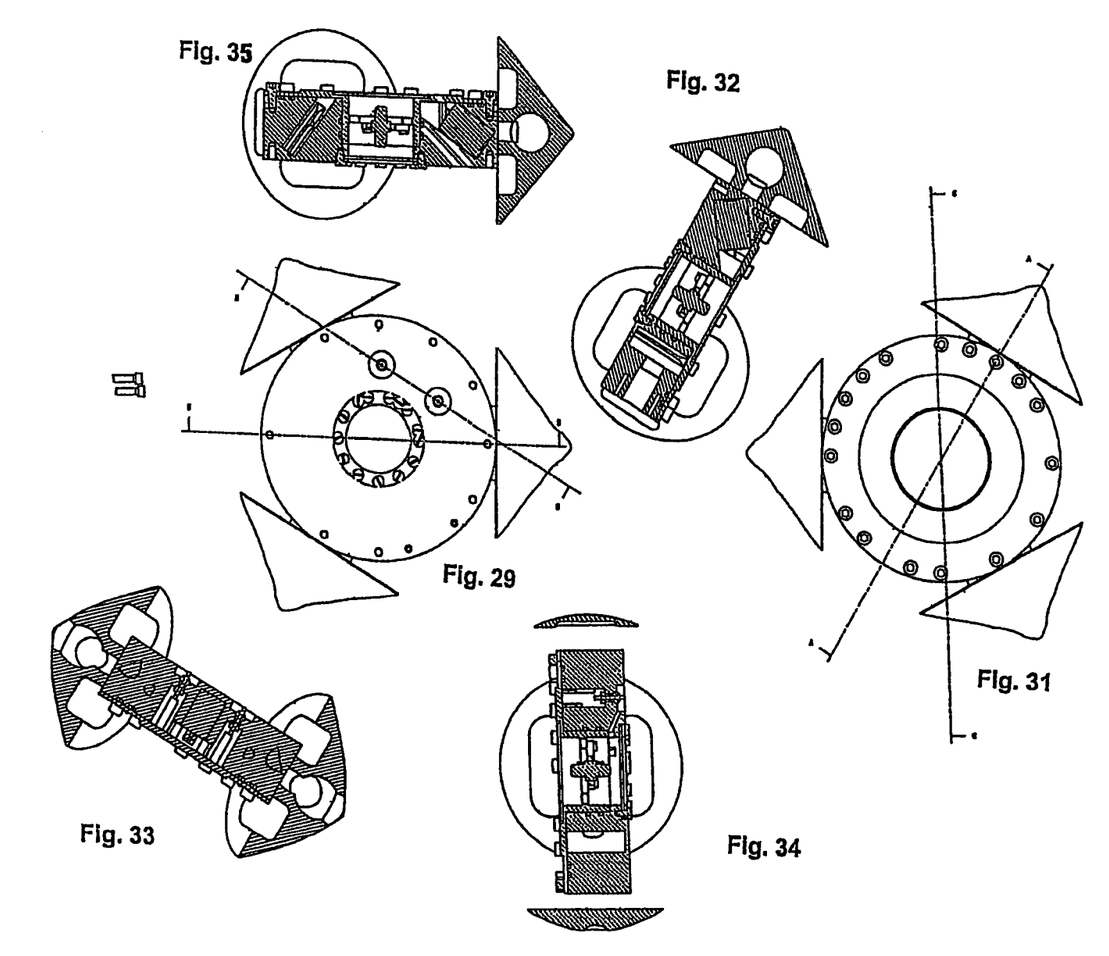
FIG. 29 is a bottom view of another preferred embodiment of a sensor.
FIG. 31 is a top view of the sensor shown in FIG. 29.
FIG. 32 is a cross sectional view of the sensor taken through line A-A of FIG. 31.
FIG. 33 is a cross sectional view of the sensor taken through line B-B of FIG. 29.
FIG. 34 is a cross sectional view of the sensor taken through line C-C of FIG. 31.
FIG. 35 is a cross sectional view of the sensor taken through line D-D of FIG. 29.
Figure 30:
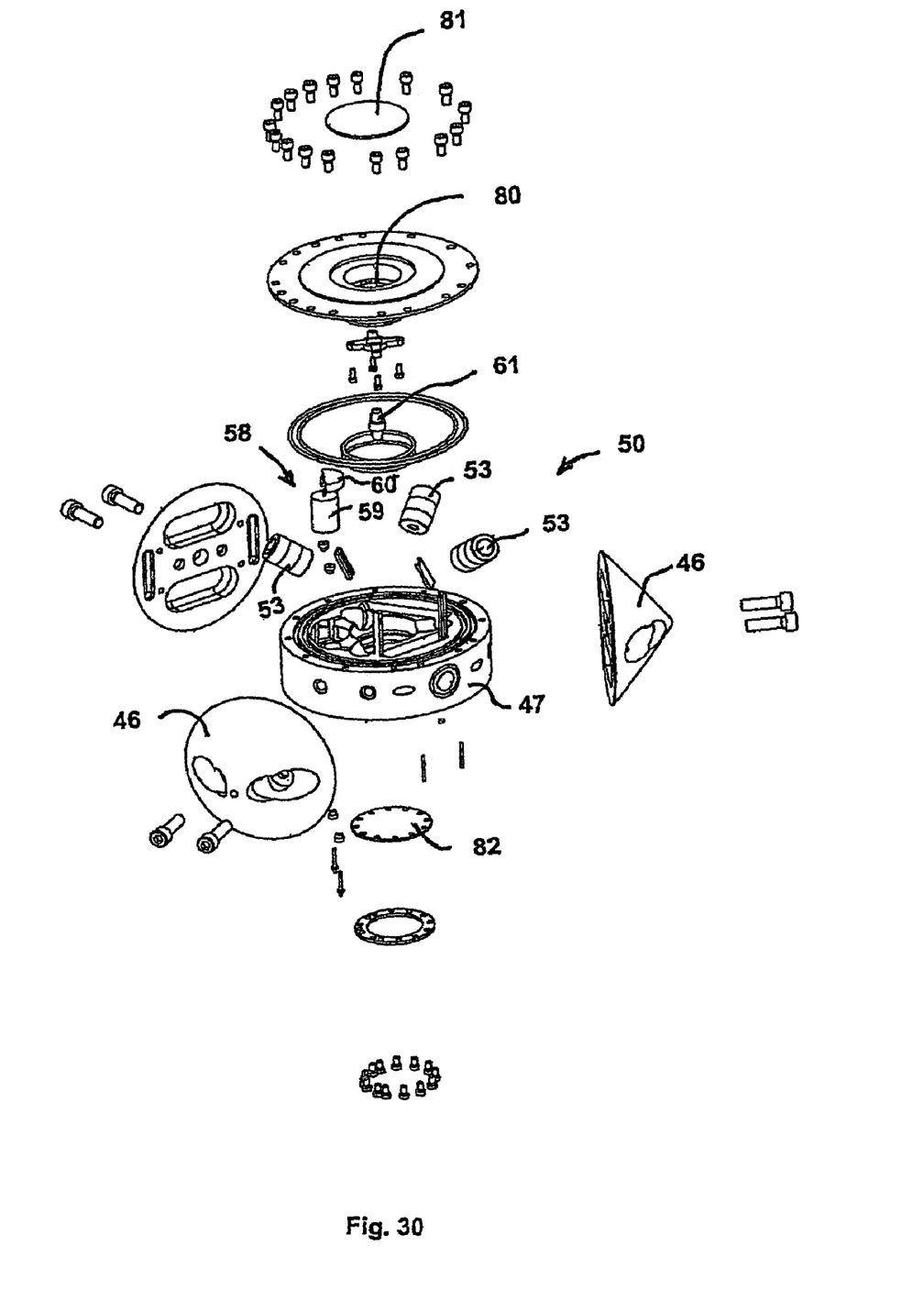
FIG. 30 is an exploded disassembled view of the sensor shown in FIG. 29.

The connection of the sensor 41 to the recorder unit 44 via connector 43 allows for a degree of relative rotation between the sensor 41 and the recorder unit 44. This is necessary because the sensor 41 should engage the seafloor on all three feet 46, either in a first orientation, or in a second orientation inverted relative to the first orientation. If the sensor 41 lands on the seafloor with an elongate dimension of the body 47 at an angle to the seafloor, the sensor 41 is able to rotate separately of the recorder unit 44, to allow the sensor 41 to securely engage the seafloor on all three feet 46. However, it is desirable to limit the total amount of allowable rotation of the sensor 41 relative to the recorder unit 44, otherwise the electrical cable 48 inside the connector 43 may be subject to damage caused by excessive torsional forces. Hence, the rotational link 49 allows for the sensor 41 to be separately rotatable relative to the recorder unit 44, within a predefined angular range, which, in the preferred embodiment allows a total relative rotation of 180°. Of course, other embodiments allow for a greater or lesser angular range of relative rotation, for example the angular range is equal to, or less than approximately +180° and −180° in one embodiment and equal to, or less than approximately +90° and −90° in another embodiment. Mechanical stops within the rotational link 49 define the limits of relative rotation. Resilient biasing, for example a return spring, is utilised to bias the rotational link 49 toward a neutral position. The rotational link 49 interfaces directly with a removable end cap 67 on the recorder unit 44, as best shown in FIG. 25. The rotational link also prevents torsional coupling of vibrations between the recorder unit 44 and the sensor 41.

The sensor 41 may be a prior art cylindrical four-component seismic ocean bottom cable sensor such as the Geospace Sea Array 4, however preferably the sensors 41 disclosed below are utilised.

The sensor 41 includes a body 47 adapted to house sensor electronics 50, with a plurality of feet 46 disposed on, or adjacent to, the body 47. The figures illustrate two embodiments of sensors 41. The first embodiment is best shown in FIGS. 2 and 5 to 11 and the second embodiment is best shown in FIGS. 30 to 35. One technical difference between the two embodiments relates to the mounting of the feet 46 onto the body 52. In the first embodiment of the sensor 41, the feet 46 are mounted via brackets 83, whereas in the second sensor embodiment the feet 46 are mounted directly to the body 47. Another technical difference between the two embodiments is the disposition of the geophones 53 and this is discussed in greater detail below. The main function of the geophones is to detect seismic motion, for example shear waves propagating through the seafloor, and geophones generally do so along a single axis of sensitivity. Geophones 53 are generally available in three varieties:

Type 1: geophones, adapted for deployment to sense seismic movements in a horizontal direction;

Type 2: geophones, adapted for deployment to sense seismic movements in a vertical direction, however these will generally only function in one orientation, and not in an inverted orientation; and Type 3: "omnidirectional" geophones, which are adapted to sense seismic movements in any direction, however these are generally of lesser sensitivity as compared to the two preceding types, and have a sensitivity which varies slightly with inclination.

Different embodiments of the present invention utilise various types of geophone to solve the technical problems associated with having the sensor 41 land on the seafloor in one of two possible orientations, one inverted relative to the other. The electronics 50 of the first sensor embodiment 41 includes two horizontal orthogonally oriented type-1 geophones and two type-2 geophones oriented vertically, with one inverted with respect to the other and wired in series, or parallel, or their outputs electrically summed in electronic preamplifiers, or the output of the favourable geophone selected by tilt switches. Provided the seafloor on which the sensor 41 lands is horizontal within typically 10 degrees, the sensor 41 can fall on either the first or second base 55 or 56 and one vertical geophone 53 will be sensitive and correctly oriented and the other will be insensitive with little or no output. The resulting loss of signal to electrical noise ratio due to electrical or electronic summation is approximately 3 dB from that of a single correctly oriented or switch-selected type-2 geophone, which is acceptable.

The electronics 50 of the second sensor embodiment includes three type-3 geophones 53 housed within the body 47 and oriented into a triaxial symmetry in the horizontal plane. Each of these omnidirectional geophones 53 is orthogonal with respect to the others and each of them makes an angle of approximately 58° relative to the horizontal.

Assuming the sensor 41 falls on a nominally horizontal seafloor, the orientation of all the geophones relative to the gravity field is similar and therefore all geophones have a similar sensitivity.

Another solution to the problem of providing a geophone set which can function in two orientations, one being inverted with respect to the other, is provided by co-pending Australian Provisional Patent Application No. PS2256 entitled "Improved Seismic Sensors" in the name of Thales Underwater Systems Pty Limited, the contents of which are hereby incorporated in their entirety by reference. Similarly, the contents of PCT Application No. PCT/AU03/00562 (International Publication No. WO 03/096071), which is also in the name of Thales Underwater Systems Pty Limited, are also hereby incorporated in their entirety by reference. Geophones 53 in accordance with PS2256 and/or PCT/AU03/00562 are utilised in an alternative embodiment of the present invention. It is also possible to mount the geophones on gimbals.

In both the first and second sensor embodiments, a hydrophone 61 is centrally disposed within the body 47, adjacent the plurality of geophones 53. The hydrophone is disposed in a fluid filled cavity 80 with acoustic soft windows 81 and 82 at either end of the cavity 80, thus allowing detection of the "P" wave. The acoustic soft windows 81 and 82 are manufactured from an elastic membrane to minimise the flow noise that can be generated by water currents near the seafloor. Preferably the hydrophone 61 is of the piezoelectric tube type as commonly used in military towed arrays.

Each of the feet 46 define a projection 54 adapted to enhance mechanical coupling of the sensor 41 with the seafloor. The projection 54 is provided by a sharp circular rim defined by a terminating edge of a conical surface disposed on the outer surface 57 of the feet 46. Preferably a total of three feet 46 are disposed regularly about the sensor body 47. More than three feet could undesirably allow the sensor 41 to rock on an uneven seafloor surface. The height of each of the feet 46 is equal to, or greater than, one tenth of the diameter of the body 47 as this matches the observed ratio of height to length for typical sea bottom roughness.

It is typically desirable to promote symmetry in the design of the sensor 41, to help ensure that the sensor reacts with equal sensitivity to seismic disturbances coming from various directions. Hence, the three feet are disposed symmetrically about a first line of symmetry disposed along a centre of said sensor body. Each foot 46 is angularly separated by 120 from the adjacent foot 46.

Preferably the density of the sensor 41 is matched to, or slightly greater than, an average density of seafloor sediment so as to minimise transfer function losses. The body 47 of the sensor 41 is a short cylinder to promote symmetry and provide a low profile. Additionally, the elongate dimension of the body 47 helps to define a first base 55 and a second base 56 opposite the first base 55. When deployed onto the seafloor, the sensor 41 is adapted to land on the seafloor with either base 55 or 56 oriented downwardly. The sensor 41 is adapted to function in either orientation, that is, with either the first base 55 or the second base 56 adjacent to the seafloor. Each of the feet 46 include an outer surface 57 having a geometry such that if the sensor 41 lands on the floor upon the outer surface 57, the sensor 41 is tilted so as to fall onto either the first or second base 55 or 56. The outer surface 57 of the feet 46 is provided by a conical surface projecting externally of the body 47.

The sensor 41 has an external surface which is substantially symmetrical about a line of symmetry intermediate said first and second bases. As mentioned previously, this symmetry assists uniformity of sensitivity with respect to variously directed seismic waves.

A vibrator 58 is disposed within or adjacent to the sensor 41 for vibrating the sensor 41 to promote coupling of the sensor 41 with the floor. In the illustrated preferred embodiments, the body 47 is cylindrical and the vibrator 58 is disposed within the body 47. The vibrator 58 includes a motor 59 for rotatably driving an off-centre mass 60. The axis of rotation of the motor 59 is parallel to the cylindrical axis of the body 47. Hence, once the sensor 41 is deployed onto the seafloor, the vibrator 58 can be used to impart a circular reciprocating motion to the sensor 41. The seafloor is usually either soft sediment or hard rock. On a soft seafloor surface, the vibration accelerates partial burying of the feet 46 into the seafloor, with the sharp edges 54 of the feet 46 effectively digging into the sediment. On a hard seafloor surface the vibrator 58 generates motion to ensure the feet are disposed at a stable location. An additional advantage of the vibrator 58 is that the signals sensed by the geophones 53 during vibration can give insights into the quality of coupling of the sensor 41 with the seafloor. Once suitable coupling has been achieved, the vibrator 58 is switched off to enable seismic measurements to commence.

Figures 13, 14, 15, 17:
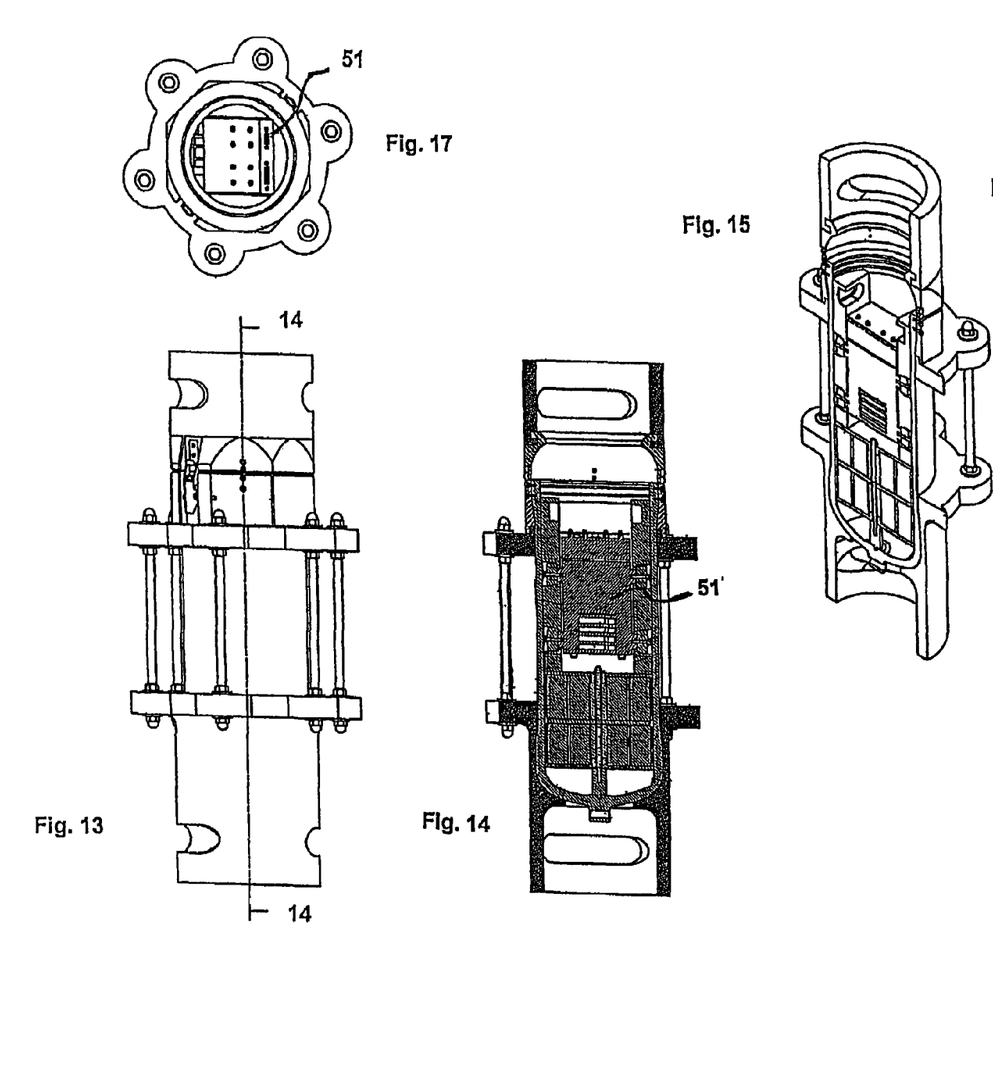
FIG. 13 is a side view of a recorder unit according to a preferred embodiment of the present invention.
FIG. 14 is a cross sectional view of the recorder unit taken along line 14-14 of FIG. 13.
FIG. 15 is a perspective view of the section shown in FIG. 14.
FIG. 17 is an end view of the recorder unit with the end cap removed

The recorder unit 44 houses electronics 51 predominantly consisting of a data logger 62 and a battery pack 63, both of which slide into the chamber 70. The data logger provides large storage capacity for data sensed by the geophones 53 and the hydrophone 61. A support 69 provides additional shock absorption for the data logger 62. Lateral mounts 71 secure the data logger 62 to its carriage and provide further shock protection. The battery pack 63 powers the data logger 62 and the sensor 41.

The chamber wall 72 is preferably manufactured from high strength grade aluminum or titanium. Techniques known in the art of manufacturing pressure housings such as cylinders for deep water diving may be employed for the manufacture of the chamber wall 72.

Figure 16:
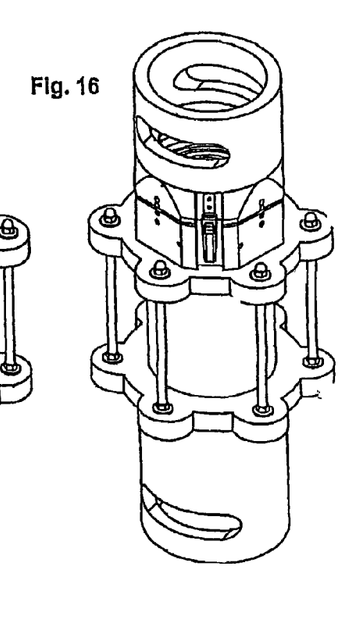
FIG. 16 is a perspective view of the recorder unit.

Projections 64 formed from a resilient material, for example a two-part Polyurethane such as vibrathane, are disposed at either end of the main recorder unit 44 to provide shock protection during transportation, deck handling, and deployment. Handles 65 may be formed into some of the projections 64 to assist handling of the recorder unit 44. Lateral projections 68 provide further shock protection and also function as feet for the recorder unit 44 to give stability when deployed. Additional handles are provided by six metal bracing members 66 disposed evenly about the circumference of the recorder unit 44 intermediate the lateral projections 68.

A removable cap 67 is provided at one end of the recorder unit 44 to allow for access to the electronics 51 to carry cut functions between deployments such as down loading data stored in the data logger 62 and re-charging the battery pack 63. The removable cap 76 is retained in place by latches 84 and double O-ring seals are used to form a high pressure water tight seal.

The preferred embodiment may be deployed onto the seafloor according to a number of different methodologies. One exemplary method is in accordance with co-pending Australian Provisional Patent Application No. PS2255, entitled 'Method for Deploying Seafloor Equipment', in the name of Thales Underwater Systems Pty Limited, the contents of which are hereby incorporated in their entirety by reference. Similarly, the contents of PCT Application No. PCT/AU03/00561 are hereby incorporated in their entirety by reference.

Recovery of the apparatus 40 is preferably achieved with the use of a recovery means such as a rope attached to a buoy or a surface vessel. Alternatively, a float with a weight release mechanism may be utilised. Such recovery means is preferably attached to the recorder unit 44, but can also be tethered to the sensor 41 provided adequate vibration isolation is provided.

Some of the preferred embodiments provide one or more of the following advantages:

- a light, compact, sensitive and reliable sensor 41 and recorder unit 44 which does not require a heavy chassis;
- an apparatus 40 which allows for relatively simple deployment due to the self-orienting nature of the sensor 41 when landing on the seafloor and the fact that the sensor 41 can function in two orientations, one being inverted relative to the other, without requiring a complex release mechanism;
- a sensor 41 which couples effectively to the seafloor;
- protection from external physical shocks; and
- good uniformity of sensing due to a high degree of sensor symmetry.

Although the invention has been described with reference to specific examples, it will be appreciated by those skilled in the art that the invention may be embodied in many other forms.

What is claimed is:

1. A data sensing and recording apparatus for deployment into a body of water defining a floor, said apparatus comprising:
    a sensor comprising:
        a body adapted to house sensor electronics; and
        a plurality of feet disposed on or adjacent to said body, each of said feet defining a projection adapted to enhance mechanical coupling of the sensor with a floor of a body of water;
    a recorder unit; and
    an articulated connector affixed at one end to the sensor and at an opposite end to the recorder unit, the articulated connector being configured to bend within a limited range of movement, wherein the limited range of movement defines bending to a maximum of 90°, and not more than 90°, wherein when the apparatus free-falls through the body of water and lands on the floor, limited bending of the articulated connector induces separation between the sensor and the recorder unit, and the articulated connector substantially vibrationally de-couples the sensor from the recorder unit.

2. A data sensing and recording apparatus according to claim 1 wherein a total of three of said feet are disposed regularly about said sensor body.

3. A data sensing and recording apparatus according to claim 2 wherein said three feet are disposed symmetrically about a first line of symmetry disposed along a centre of said sensor body.

4. A data sensing and recording apparatus according to claim 1 wherein said sensor defines a first base and a second base opposite said first base, wherein the sensor is adapted for deployment such that either the first base or the second base is adjacent the floor.

5. A data sensing and recording apparatus according to claim 4 wherein an external surface of said sensor is substantially symmetrical about a line of symmetry intermediate said first and second bases.

6. A data sensing and recording apparatus according to claim 4 wherein one or more of said feet include an outer surface having a geometry such that if said sensor lands on the floor upon said outer surface, the sensor is tilted so as to fall onto either the first or second base.

7. A data sensing and recording apparatus according to claim 6 wherein said outer surface of said one or more feet is a conical surface projecting externally of said body.

8. A data sensing and recording apparatus according to claim 7 wherein said projection is a sharp circular rim defined by a terminating edge of said conical surface.

9. A data sensing and recording apparatus according to claim 1 further including a vibrator disposed within or adjacent to said sensor for vibrating the sensor so as to promote coupling of the sensor with said floor.

10. A data sensing and recording apparatus according to claim 9 wherein said body is cylindrical and wherein said vibrator includes a motor for rotatably driving an off-centre mass, an axis of rotation of said motor being parallel to an axis of the cylindrical body.

11. A data sensing and recording apparatus according to claim 1 wherein said body is cylindrical and wherein a height of each of the feet is equal to, or greater than, one tenth of a diameter of the body.

12. A data sensing and recording apparatus according to claim 1 wherein a plurality of geophones are housed within said body.

13. A data sensing and recording apparatus according to claim 12 wherein a hydrophone is disposed within said body and adjacent said plurality of geophones.

14. A data sensing and recording apparatus according to claim 1 wherein the sensor is separately rotatable relative to said recorder unit.

15. A data sensing and recording apparatus according to claim 1 wherein the sensor is separately rotatable relative to the recorder unit within a predefined angular range.

16. A data sensing and recording apparatus according to claim 15 wherein the angular range is equal to, or less than, approximately +180° and −180°.

17. A data sensing and recording apparatus according to claim 15 wherein the angular range is equal to, or less than, approximately +90° and −90°.

18. A data sensing and recording apparatus according to claim 1 wherein the articulated connector is adapted to house a communications cable electrically connected at the first end to the sensor electronics disposed within the sensor and electrically connected at the second end to electronics disposed within the recorder unit.

19. A data sensing and recording apparatus according to claim 1 wherein a length of the articulated connector is dynamically variable within a predefined range so as to eradicate or minimise coupling of any vibration of the recorder unit to the sensor.

20. A data sensing and recording apparatus according to claim 19 wherein the predefined range is equal to or less than 4% of the total connector length.

21. A data sensing and recording apparatus according to claim 1 wherein the body is adapted for deployment in a first orientation, and for deployment in a second orientation inverted relative to the first orientation; and
    a plurality of omnidirectional geophones each having an axis of sensitivity;
    the geophones having a sensitivity which varies dependent upon an inclination of each geophones axis of sensitivity relative to a local gravitational field;
    whereby each of the geophones are disposed within the body such that, when deployed, each axis of sensitivity is disposed at substantially the same angle of inclination relative to the local gravitational field, thereby allowing all of the geophones to exhibit the same or similar sensitivity regardless of whether the body is in the first or second orientation.

22. A data sensing and recording apparatus according to claim 21 wherein each of the omnidirectional geophones are disposed such that their axes of sensitivity are orthogonal to each other.

23. A data sensing and recording apparatus according to claim 21 wherein, once said sensor is deployed, each of said omnidirectional geophones have an axis of sensitivity which is inclined relative to the horizontal by approximately 58°.

24. A data sensing and recording apparatus according to claim 1 wherein the body is adapted for deployment in a first orientation, and for deployment in a second orientation inverted relative to the first orientation;
   a pair of horizontal-type geophones adapted for sensing horizontal seismic movements disposed horizontally and orthogonally relative to each other; and
   first and second vertical-type geophones disposed vertically and adapted for sensing vertical seismic movements, each vertical-type geophone having a functional orientation and an insensitive orientation, the first vertical-type geophone being disposed such that its functional orientation is inverted relative to the functional orientation of the second vertical-type geophone,
   such that, when the body is in the first orientation, the first vertical-type geophone is functional and the second vertical-type geophone is insensitive and when the body is in the second orientation, the second vertical-type geophone is functional and the first vertical-type geophone is insensitive.

25. A data sensing and recording apparatus according to claim 24 wherein the vertical-type geophones are electrically connected in series or parallel, or their outputs electrically summed in electronic preamplifiers, or the output of the favourable geophone is selected by tilt switches.

* * * * *

UNITED STATES PATENT AND TRADEMARK OFFICE
CERTIFICATE OF CORRECTION

PATENT NO. : 7,586,809 B2  
APPLICATION NO. : 11/186003  
DATED : September 8, 2009  
INVENTOR(S) : Francois Luc Page 1 of 1

It is certified that error appears in the above-identified patent and that said Letters Patent is hereby corrected as shown below:

On the Title Page, insert item (63):

--Related U.S. Application Data

(63) Continuation of application No. PCT/AU2004/000067, filed on Jan. 20, 2004.--

Signed and Sealed this

Twenty-fourth Day of November, 2009

David J. Kappos  
*Director of the United States Patent and Trademark Office*